US012563521B2

(12) United States Patent
Dong

(10) Patent No.: US 12,563,521 B2
(45) Date of Patent: Feb. 24, 2026

(54) PARAMETER CONFIGURATION METHOD, PARAMETER CONFIGURATION APPARATUS, AND STORAGE MEDIUM

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 341 days.

(21) Appl. No.: 18/255,765

(22) PCT Filed: Dec. 8, 2020

(86) PCT No.: PCT/CN2020/134697
§ 371 (c)(1),
(2) Date: Jun. 2, 2023

(87) PCT Pub. No.: WO2022/120611
PCT Pub. Date: Jun. 16, 2022

(65) Prior Publication Data
US 2024/0007989 A1 Jan. 4, 2024

(51) Int. Cl.
*H04W 64/00* (2009.01)
*H04L 5/00* (2006.01)

(52) U.S. Cl.
CPC ........... *H04W 64/00* (2013.01); *H04L 5/0051* (2013.01)

(58) Field of Classification Search
CPC ..... H04W 4/029; H04W 20/10; H04W 64/00; H04L 5/0051
See application file for complete search history.

(56) References Cited

U.S. PATENT DOCUMENTS

2018/0217224 A1    8/2018    Jain et al.

FOREIGN PATENT DOCUMENTS

| CN | 110535578 A | 12/2019 |
|----|-------------|---------|
| JP | 2023-536234 A | 8/2023 |
| WO | 2020167057 A1 | 8/2020 |
| WO | WO 2022031974 A1 | 2/2022 |

OTHER PUBLICATIONS

International Search Report and Written Opinion of International Application No. PCT/CN2020/134697, dated May 17, 2021, 12 pages.
Notice of Reasons for Refusal issued by the Japanese Patent Office on Jun. 28, 2024, in corresponding Application No. JP 2023-534216, 6 pages.
Office Action for Russian Application No. 2023117610/07, dated Jan. 1, 2024, 23 pages.
European Patent Office, Extended European Search Report issued in Application No. 20964556.3 dated Jan. 5, 2024, 14 pages.
Xiaomi, "Potential positioning enhancements," 3GPP TSG RAN WG1 #103-e, R1-2008083, e-Meeting, Oct. 26-Nov. 13, 2020, 5 pages.
First Office Action issued by the State Intellectual Property Office of People's Republic of China on Dec. 22, 2024, in corresponding Application No. CN 202080003958.X, 16 pages.

*Primary Examiner* — Sam Bhattacharya
(74) *Attorney, Agent, or Firm* — Finnegan, Henderson, Farabow, Garrett & Dunner, L.L.P.

(57) ABSTRACT

A parameter configuration method is performed by a terminal, and includes: determining a preconfigured positioning reference signal (PRS) configuration parameter set, wherein the PRS configuration parameter set includes at least one set of PRS configuration parameters; and determining a set of PRS configuration parameters for receiving a PRS based on the PRS configuration parameter set.

13 Claims, 7 Drawing Sheets determining a preconfigured PRS configuration parameter set     S11 determining a PRS configuration parameter for receiving a PRS based on the PRS configuration parameter set     S12 determining a PRS configuration parameter set     S21 determining first indication information    S31 determining the first indication information    S32 determining second indication information    S41 determining the second indication information    S42

PARAMETER CONFIGURATION METHOD, PARAMETER CONFIGURATION APPARATUS, AND STORAGE MEDIUM

CROSS-REFERENCE TO RELATED APPLICATION

This application is a U.S. national phase of International Application No. PCT/CN2020/134697, filed Dec. 8, 2020, the entire content of which is incorporated herein by reference.

TECHNICAL FIELD

The disclosure relates to a field of wireless communication technology, in particular to a parameter configuration method, a parameter configuration apparatus and a storage medium.

BACKGROUND

In a communication system, a variety of positioning technologies are further introduced to realize positioning of a terminal. For downlink, there is a downlink and uplink combined positioning technology, such as a downlink time difference of arrival (DL-TDOA) positioning technology, a downlink angle of arrival (DL-AOA) positioning technology, a multiple round-trip time (multi-RTT) positioning technology, the terminal needs to obtain a configuration of a positioning reference signal (PRS), so as to perform relative measurement on the PRS, and then the UE can be positioned.

For an application scenario of the Industrial Internet of Things (IIoT), a requirement of reducing an end-to-end latency is proposed, so it is necessary to further reduce a latency of the existing positioning technology to meet a service requirement. In the related art, PRS parameters are configured for the terminal only in a process of positioning the terminal to realize positioning of the terminal, which cannot meet the requirement of reducing the latency.

SUMMARY

In order to overcome problems existing in the related art, the disclosure provides a parameter configuration method, a parameter configuration apparatus and a storage medium.

According to a first aspect of embodiments of the disclosure, a parameter configuration method is provided. The method is performed by a terminal and includes:

determining a preconfigured positioning reference signal (PRS) configuration parameter set, in which the PRS configuration parameter set includes at least one set of PRS configuration parameters; and determining a set of PRS configuration parameters for receiving a PRS based on the PRS configuration parameter set.

According to a second aspect of embodiments of the disclosure, a parameter configuration method is provided. The method is performed by a core network device and includes:

determining a preconfigured positioning reference signal (PRS) configuration parameter set.

According to a third aspect of embodiments of the disclosure, a parameter configuration method is provided. The method is performed by a wireless network device and includes:

determining first indication information, in which the first indication information is configured to instruct a terminal to preconfigure a PRS configuration parameter set; and sending the first indication information.

According to a fourth aspect of embodiments of the disclosure, a parameter configuration apparatus is provided. The apparatus includes:

a processor; and a memory configured to store instructions executable by the processor; in which the processor is configured to perform the parameter configuration method according to the first aspect or any embodiment of the first aspect, or perform the parameter configuration method according to the second aspect or any embodiment of the second aspect, or perform the parameter configuration method according to the third aspect or any embodiment of the third aspect.

According to an fifth aspect of the disclosure, a non-transitory computer-readable storage medium is provided. When instructions in the storage medium are executed by a processor of a mobile terminal, the mobile terminal is caused to perform the parameter configuration method according to the first aspect or any embodiment of the first aspect, or perform the parameter configuration method according to the second aspect or any embodiment of the second aspect, or perform the parameter configuration method according to the third aspect or any embodiment of the third aspect.

It is to be understood that the foregoing general description and the following detailed description are exemplary and explanatory only and are not restrictive of the present disclosure.

BRIEF DESCRIPTION OF THE DRAWINGS

The accompanying drawings, which are incorporated in and constitute a part of the specification, illustrate embodiments consistent with the disclosure and serve to explain the principles of the disclosure together with the description.

DETAILED DESCRIPTION

Reference will now be made in detail to exemplary embodiments, examples of which are illustrated in the accompanying drawings. The following description refers to the accompanying drawings in which the same or similar numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
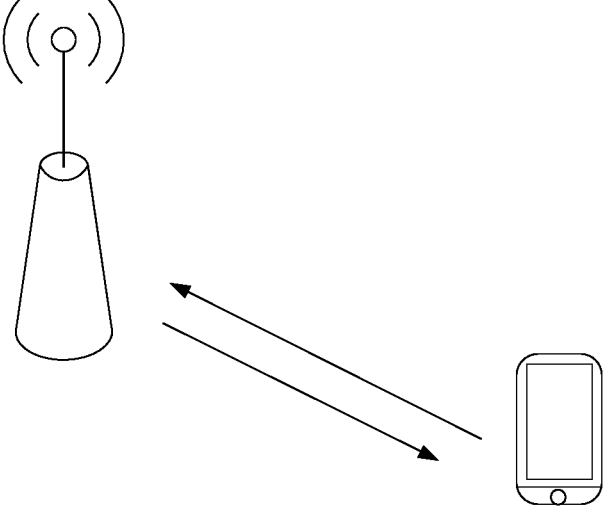
FIG. 1 is a schematic diagram of a wireless communication system according to an embodiment.

The parameter configuration method provided by the embodiment of the disclosure can be applied to a wireless communication system illustrated in FIG. 1. Referring to FIG. 1, the wireless communication system includes a terminal and a network device. Information is sent and received between the terminal and the network device through wireless resources.

It can be understood that the wireless communication system illustrated in FIG. 1 is only a schematic illustration, and the wireless communication system may further include other network devices, for example, may also include a core network device, a wireless relay device, and a wireless backhaul device, etc., which are not shown in FIG. 1. The number of network devices and the number of terminals included in the wireless communication system are not limited in embodiments of the disclosure.

It can be further understood that the wireless communication system according to the embodiment of the disclosure is a network that provides a wireless communication function. The wireless communication system can employ various communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), carrier sense multiple access with collision avoidance. According to the capacity, speed, delay and other factors of the network, the network can be classified into a second generation (2G) network, a 3G network, a 4G network or a future evolution network, such as a 5G network. The 5G network can also be referred to as a new radio (NR) network. For convenience of description, the wireless communication network may be referred to as a network for short in the disclosure.

Further, the network device involved in the disclosure may also be referred to as a wireless access network device. The wireless access network device may include: a base station, an evolved node base station (evolved node B), a home base station, an access point (AP), a wireless relay node, a wireless backhaul node, a transmission point (TP) or a transmission and reception point (TRP) in a wireless fidelity (WIFI) system, etc. The base station can also be a gNB in an NR system, or can also be a component or a part of a device that constitutes a base station. When it is a vehicle-to-everything (V2X) communication system, the network device may also be a vehicle-mounted device. It should be understood that, in the embodiments of the present disclosure, a specific technology and a specific device form adopted by the network device are not limited.

Further, the terminal involved in the present disclosure may also be referred to as a terminal device, a user equipment (UE), a mobile station (MS), a mobile terminal (MT), etc., which is a device that provides voice and/or data connectivity. For example, the terminal may be a handheld device with a wireless connection function, a vehicle-mounted device, or the like. At present, some examples of terminals include: a mobile phone, a pocket personal computer (PPC), a palmtop computer, a personal digital assistant (PDA), a notebook computer, a tablet computer, a wearable device, or a vehicle-mounted device, etc. In addition, when it is a vehicle-to-everything (V2X) communication system, the terminal device can also be a vehicle-mounted device. It should be understood that a specific technology and a specific device form adopted by the terminal are not limited in the embodiments of the present disclosure.

Figure 2:
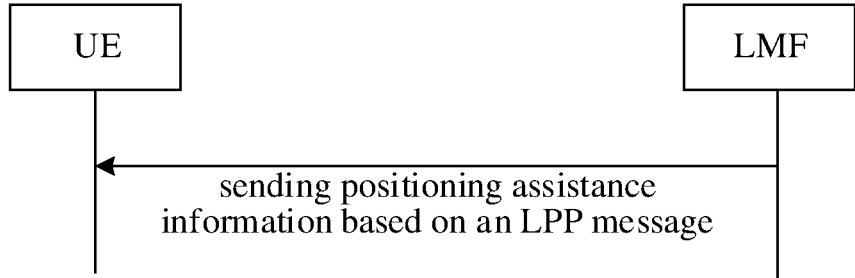
FIG. 2 is a schematic diagram of a process for obtaining a PRS configuration according to the disclosure.

In a communication system, a variety of positioning technologies are further introduced to realize positioning of a terminal. For downlink, there is a downlink and uplink combined positioning technology, such as a downlink time difference of arrival (DL-TDOA) positioning technology, a downlink angle of arrival (DL-AOA) positioning technology, a multiple round-trip time (multi-RTT) positioning technology, the terminal needs to obtain a positioning reference signal (PRS) configuration, and then the UE can be positioned. For example, FIG. 2 is a schematic diagram of a process for obtaining a PRS configuration according to the disclosure. As illustrated in FIG. 2, the UE may obtain the PRS configuration through the following process.

A location management Function (LMF) network element actively provides positioning assistance information to the UE. The LMF may provide the positioning assistance information to the UE through a long term evolution (LTE) positioning protocol (LPP). The assistance information includes the PRS configuration.

Figure 3:
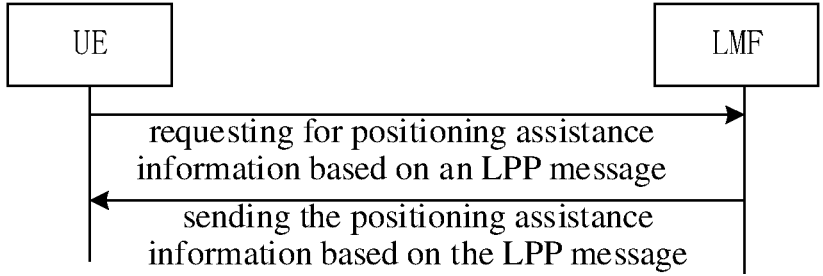
FIG. 3 is a schematic diagram of another process for obtaining a PRS configuration according to the disclosure.

Alternatively, in another implementation, FIG. 3 is a schematic diagram of another process for obtaining a PRS configuration according to the disclosure. As illustrated in FIG. 3, the UE sends a request for positioning assistance information to an LMF, and the LMF sends assistance information to the UE after receiving the request from the UE. The assistance information includes the PRS configuration.

Figures 4, 5, 6:
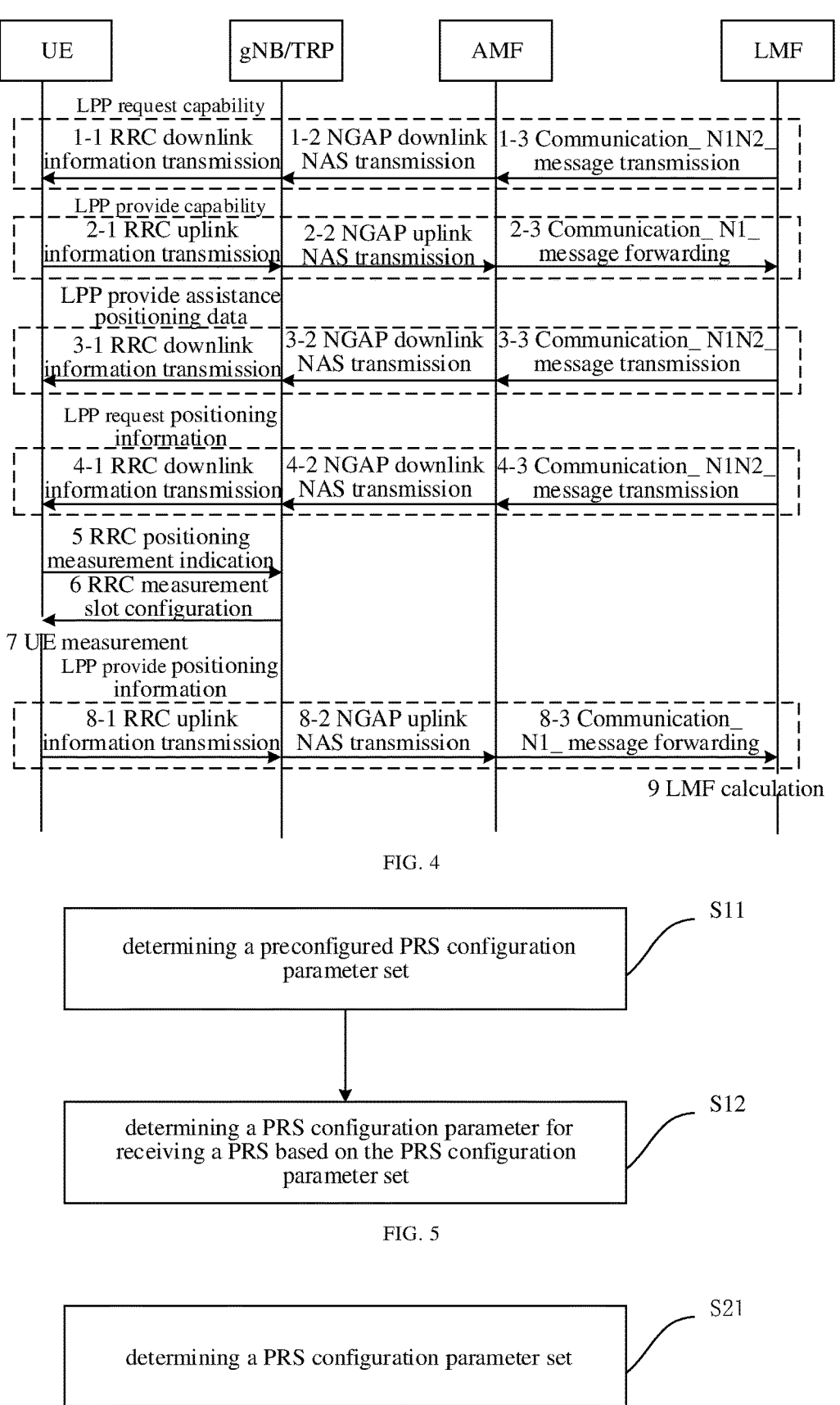
FIG. 4 is a schematic diagram of a further process for obtaining a PRS configuration according to the disclosure.
FIG. 5 is a flowchart of a parameter configuration method according to an embodiment of the disclosure.
FIG. 6 is a flowchart of a parameter configuration method according to another embodiment of the disclosure.

In the following embodiment, taking the DL-AOA/DL-TDOA positioning technology as an example, positioning of the UE is explained with reference to FIG. 3. FIG. 4 is a schematic diagram of a further process for obtaining a PRS configuration according to the disclosure. As illustrated in FIG. 4, an LMF sends an LPP request capability information to the UE to request for a positioning capability of the UE, the UE may provide its positioning capability to the LMF and receives positioning assistance information and a positioning information request sent by the LMF. The UE receives a PRS and performs measurement on the PRS based on a measurement interval configured by the network. The UE provides a measurement result to the LMF. The positioning assistance information includes the PRS configuration.

It can be seen from the above embodiment that in a process of using a downlink positioning technology for positioning of the UE, the LMF needs to provide the UE with positioning assistance information through the LPP message, and configures the PRS configuration for the terminal through the positioning assistance information. In the process, the end-to-end latency is about 50 ms. However, in the related art, for the IIoT scenario, it is further proposed that the end-to-end latency is about 10 ms. Therefore, it is necessary to further reduce the latency of the existing positioning technology to meet a positioning requirement.

Based on this, the disclosure proposes that the PRS configuration can be pre-configured for the UE, and no PRS configuration information needs to be sent to the UE in a process of positioning of the UE, thus achieving an effect of reducing the positioning latency. The network device pre-configures PRS configuration information for the UE. When the UE needs to use the PRS configuration information, the network device can activate the PRS configuration information used by the UE. The UE determines to measure the PRS based on the activated PRS configuration information to complete the positioning of the UE, so as to reduce the positioning latency. It can be understood that, in the embodiment of the disclosure, the PRS configuration information may also be referred to as a PRS configuration parameter.

FIG. 5 is a flowchart of a parameter configuration method according to an embodiment of the disclosure. As illustrated in FIG. 5, the parameter configuration method is applied to a terminal and includes the following.

At block S11, a preconfigured PRS configuration parameter set is determined.

In the embodiment of the disclosure, the UE determines the PRS configuration parameter set, i.e., the preconfigured PRS configuration parameter se. The PRS configuration parameter set includes at least one set of PRS configuration parameters. The UE may measure a PRS based on at least one set of PRS configuration parameters to determine UE positioning information.

The PRS configuration parameter set can be one of the following.

In an implementation, the PRS configuration parameter set may include PRS configuration parameters of a same wireless network device, and the PRS configuration parameter set includes at least one set of PRS configuration parameters.

In an implementation, the PRS configuration parameter set may include PRS configuration parameters of multiple different wireless network devices, the PRS configuration parameter set includes at least one set of PRS configuration parameters, and each set of PRS configuration parameters corresponds to the PRS configuration parameters of multiple different wireless network devices.

At block S12, a PRS configuration parameter for receiving a PRS is determined based on the PRS configuration parameter set.

In an embodiment of the disclosure, the UE may determine the PRS configuration according to the preconfigured PRS configuration parameter set, and the PRS configuration determined based on the PRS configuration parameter set is used to receive the PRS. As described above, in an implementation, the PRS configuration parameter set includes PRS configuration parameters of the same wireless network device, and the UE determines at least one set of PRS configurations based on different PRS configuration parameter sets. In an implementation, the PRS configuration parameter set includes PRS configuration parameters of different wireless network devices, and the UE may determine at least one set of PRS configurations based on the preconfigured PRS configuration parameter set, and each determined set of PRS configuration parameters corresponds to PRS configuration parameters of multiple different wireless network devices, and then the PRS configuration parameter for receiving the PRS is determined.

In some embodiments of the disclosure, the UE may determine the preconfigured PRS configuration parameter set according to received first indication information. The first indication information is configured to instruct the UE to preconfigure the PRS configuration parameter set.

In an embodiment of the disclosure, the UE may receive the first indication information based on a random access message (message, MSG) 4 (message) \MSG 2 in a random access process between the UE and a wireless network device (e.g., a base station).

In an embodiment of the disclosure, the UE may receive the first indication information through a radio resource control (RRC) message.

In an embodiment of the disclosure, the UE may receive the first indication information through downlink control information (DCI).

In an embodiment of the disclosure, the UE may receive the first indication information through an LPP message sent by the LMF.

It can be understood that, in response to receiving the LPP message, the UE determines the preconfigured PRS configuration parameter set included in the LPP message, receives the preconfigured PRS configuration parameter set through the RRC message or the MSG 2/MSG 4, and determines to use the preconfigured PRS configuration parameter set included in the LPP message.

In an embodiment of the disclosure, the UE may receive second indication information. The second indication information is configured to instruct the terminal to determine the PRS configuration parameter based on the PRS configuration parameter set. The UE may determine, according to the received second indication information, the PRS configuration parameter used by the UE for receiving the PRS.

In an embodiment of the disclosure, the PRS configuration determined by the UE for receiving the PRS may be a subset of the PRS configuration parameter set preconfigured by the UE. In an embodiment of the disclosure, the determined PRS configuration for receiving the PRS is referred to as a PRS configuration parameter subset, that is, the network preconfigures the PRS configuration parameter set for the UE through the first indication information. The PRS configuration parameter set includes at least one set of PRS configuration parameters. The network configures the PRS configuration parameter for the UE through the second indication information. The PRS configuration parameter configured for the UE through the second indication information is a set of PRS configuration parameters among multiple sets of PRS configuration parameters in the PRS configuration parameter set. In an embodiment of the disclosure, the second indication information includes at least one of the following:

a first indicator, configured to instruct the terminal to activate the PRS configuration parameter.

a second indicator, configured to instruct the terminal to receive the PRS.

The PRS configuration parameter that the UE is instructed to activate is a PRS configuration parameter subset. The first indicator and/or the second indicator may be a symbol such as bits.

In an implementation of the embodiment of the disclosure, the UE determines the activated PRS configuration parameter and/or the PRS configuration parameter subset in response to the received second indication information including only the first indicator, and receives the PRS. The first indicator may also implicitly instruct the UE to receive the PRS according to the activated PRS configuration parameter and/or the PRS configuration parameter subset.

In an implementation, in response to the received second indication information including only the second indicator, the UE determines to receive the PRS based on the preconfigured PRS configuration parameter set. In an embodiment of the present disclosure, if the second indication information received by the UE includes the second indicator, it is determined that the PRS configuration parameter set preconfigured by the UE includes only one set of PRS configuration parameters.

In an implementation, in response to the received second indication information including the first indicator and the second indicator, the UE determines the activated PRS configuration parameter and/or the PRS configuration parameter subset, and determines to receive the PRS based on the second indicator.

In an embodiment of the disclosure, the second indication information may be determined according to a RRC and/or MAC and/or DCI message sent by the base station. Or the second indication information may be determined based on an LPP message sent by the LMF.

In an embodiment of the disclosure, the UE measures the PRS based on the PRS configuration parameter. Further, the UE receives the PRS according to the determined PRS configuration, measures the received PRS, and determines the PRS measurement result. The measurement result may include location information.

In an embodiment of the disclosure, the UE may also send the PRS measurement result or location information to a core network device (e.g., LMF) and/or a wireless network device.

Based on the same/similar concept, the embodiment of the disclosure also provides a parameter configuration method.

FIG. 6 is a flowchart of a parameter configuration method according to an embodiment. As illustrated in FIG. 6, the parameter configuration method is applied in a core network device, and includes the following.

At block S21, a PRS configuration parameter set is determined.

In an embodiment of the disclosure, the core network device may be an LMF, the LMF determines at least one set of PRS configuration parameters, and determines the PRS configuration parameter set according to the determined at least one set of PRS configuration parameters.

In an implementation, the LMF may instruct a wireless network device to provide at least one set of PRS configuration parameters by sending an NR positioning protocol (NRPPa) message to the wireless network device. There may be one or more wireless network devices. The LMF determines the PRS configuration parameter set according to the received at least one set of PRS configuration parameters sent by one or more wireless network devices.

In an embodiment of the disclosure, the LMF sends first indication information to the UE. The first indication information is configured to instruct the terminal to preconfigure the PRS configuration parameter set.

The LMF determines the PRS configuration parameter set, and instructs the terminal to preconfigure the PRS configuration parameter set by sending the first indication information. The first indication information is configured to instruct the terminal to preconfigure the PRS configuration parameter set.

In an embodiment of the disclosure, the LMF may send the first indication information to the UE based on an LPP message.

In some embodiments of the disclosure, the LMF determines a PRS configuration parameter for instructing the UE to receive a PRS. The LMF may instruct the UE to determine the PRS configuration parameter based on the PRS configuration parameter set by sending the second indication information to the UE. The PRS configuration parameter is a subset of the PRS configuration parameter set.

In an embodiment of the disclosure, the second indication information sent by the LMF to the UE includes at least one of the following:

a first indicator, configured to instruct the terminal to activate the PRS configuration parameter.

a second indicator, configured to instruct the terminal to receive the PRS.

The PRS configuration parameter that the UE is instructed to activate is a PRS configuration parameter subset. The first indicator and/or the second indicator may be a symbol such as bits.

In an embodiment of the disclosure, the LMF may send the second indication information to the UE based on the LPP message, instructing the UE to activate the PRS configuration for receiving the PRS.

In an implementation of the embodiment of the disclosure, the second indication information sent by the LMF includes only the first indicator, and it is determined that the PRS configuration parameter and/or the PRS configuration parameter subset activated by the UE is indicated based on the first indicator. Further, an implicit indication manner may be adopted, the UE is instructed implicitly based on the first indicator to receive the PRS according to the activated PRS configuration parameter and/or the PRS configuration parameter subset.

In an implementation, the second indication information sent by the LMF includes only the second indicator, and it is determined that the UE is instructed to receive the PRS based on the preconfigured PRS configuration parameter set. In an embodiment of the present disclosure, if the second indication information sent by the LMF includes the second indicator, it is determined that the PRS configuration parameter set preconfigured by the UE includes one set of PRS configuration parameters.

In an implementation, the second indication information sent by the LMF includes the first indicator and the second indicator, it is determined that the PRS configuration parameter and/or the PRS configuration parameter subset activated by the UE is indicated based on the first indicator, and the UE is instructed explicitly based on the second indicator to receive the PRS.

In an embodiment of the disclosure, the LMF may further send third indication information to the wireless network device. The third indication information is configured to indicate the preconfigured PRS configuration parameter set to the wireless network device.

In an embodiment of the disclosure, the third indication information is further configured to instruct the wireless network device to preconfigure the PRS configuration parameter set for the UE.

In an implementation, the LMF may instruct the wireless network device to preconfigure the PRS configuration parameter set for the UE through an explicit indication manner. For example, the third indication information sent by the LMF includes the PRS configuration parameter set and an indicator configured to instruct the wireless network device to preconfigure the PRS configuration parameter set for the UE, and the wireless network device preconfigures the PRS configuration parameter set for the UE according to the received third indication information.

In an implementation, the LMF may instruct the wireless network device to preconfigure the PRS configuration parameter set for the UE through an implicit indication manner. For example, if the third indication information sent by the LMF includes the PRS configuration parameter set, the wireless network device may be implicitly instructed to preconfigure the PRS configuration parameter set for the UE, and the wireless network device may preconfigure the PRS configuration parameter set for the UE according to the received third indication information.

In an embodiment of the disclosure, the LMF may send the third indication information to the wireless network device through the NRPPa message. Of course, in the embodiments of the present disclosure, the third indication information may also be sent to the wireless network device through other messages, which is not specifically limited herein.

In an embodiment of the disclosure, the wireless network device receives the third indication information, determines the PRS configuration parameter set and sends the first indication information including the PRS configuration parameter set to the UE. The wireless network device may send the first indication information to the UE through messages MSG 4\ MSG 2 during a random access process of the UE. Or, the wireless network device determines to send the first indication information to the UE through a RRC message. Or, the wireless network device determines to send the first indication information to the UE through a DCI message.

In an embodiment of the disclosure, the LMF may further send fourth indication information to the wireless network device. The fourth indication information is configured to instruct the wireless network device to determine the PRS configuration parameter based on the PRS configuration parameter set.

In an embodiment of the disclosure, the fourth indication information is further configured to instruct the wireless network device to send the PRS according to the PRS configuration parameter.

In an implementation, the LMF may instruct the wireless network device to determine the PRS configuration parameter based on the PRS configuration parameter set through an explicit indication manner. For example, the fourth indication information sent by the LMF includes the PRS configuration parameter and an indicator configured to instruct the wireless network device to send the PRS, and the wireless network device determines the PRS configuration parameter that the UE is instructed to activate according to the received fourth indication information and sends the PRS to the UE based on the indicator configured to instruct the wireless network device to send the PRS included in the fourth indication information.

In an implementation, the LMF may instruct the wireless network device to determine the PRS configuration parameter based on the PRS configuration parameter set through an implicit indication manner. For example, if the fourth indication information sent by the LMF includes the PRS configuration parameter, the wireless network device may be implicitly instructed to determine the PRS configuration parameter based on the PRS configuration parameter set, and determine to send the PRS to the UE.

In an embodiment of the disclosure, the LMF may send the fourth indication information to the wireless network device through the NRPPa message. Of course, in the embodiments of the disclosure, the fourth indication information may also be sent to the wireless network device through other messages, which is not specifically limited herein.

In an embodiment of the disclosure, the wireless network device receives the fourth indication information, determines the PRS configuration parameter, sends the second indication information including the PRS configuration parameter to the UE, and sends the PRS corresponding to the PRS configuration parameter to the UE.

In an embodiment of the disclosure, the LMF receives the PRS measurement result. The measurement result may also be location information. In an implementation, the LMF may receive the PRS measurement result or location information sent by the UE. In another implementation, the LMF may receive the PRS measurement result or location information sent by the wireless network device.

Based on the same/similar concept, the embodiment of the disclosure also provides a parameter configuration method.

Figures 7, 8:
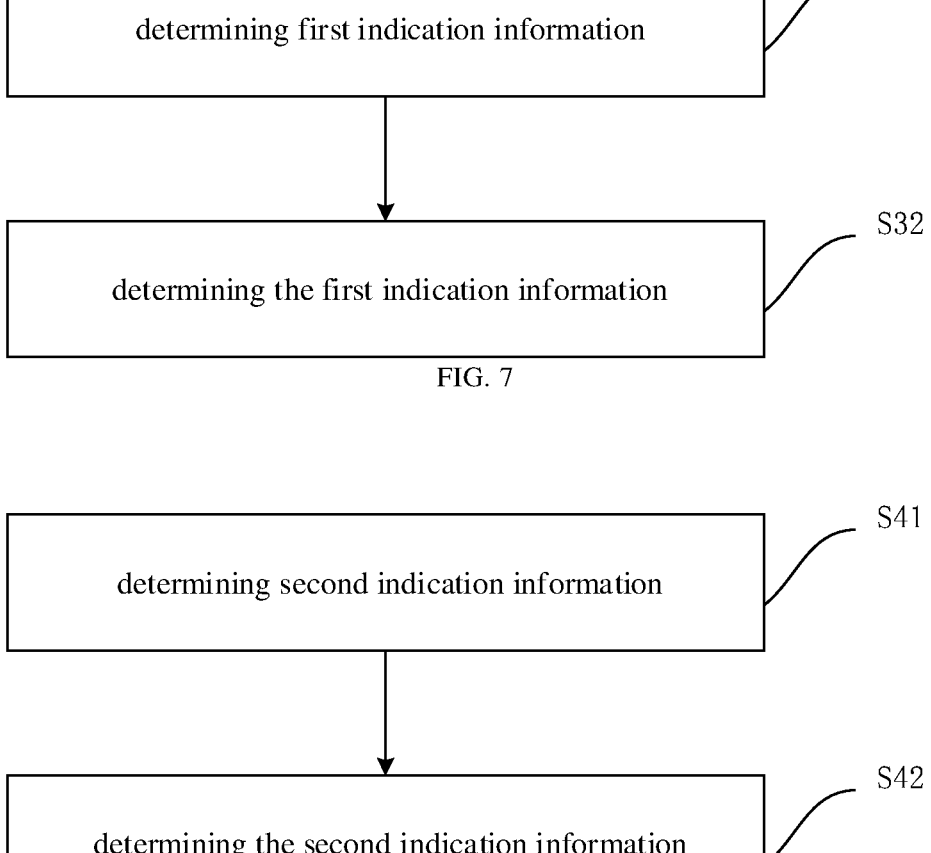
FIG. 7 is a flowchart of a parameter configuration method according to a further embodiment of the disclosure.
FIG. 8 is a flowchart of a parameter configuration method according to yet another embodiment of the disclosure.

FIG. 7 is a flowchart of a parameter configuration method according to an embodiment. As illustrated in FIG. 7, the parameter configuration method is applied in a wireless network device, and includes the following.

At block S31, first indication information is determined.

In an embodiment of the disclosure, the first indication information is configured to instruct the terminal to preconfigure a PRS configuration parameter set. The wireless network device may determine the first indication information based on a core network device (for example an LMF).

In an embodiment of the disclosure, the wireless network device determines the PRS configuration parameter set. The PRS configuration parameter set includes at least one set of PRS configuration parameters. The first indication information is determined based on the determined set of PRS configuration parameters.

At block S32, the first indication information is sent.

In an embodiment of the disclosure, the wireless network device (for example, a base station) may send the first indication information through MS G4/MSG2 in a random access process of the UE.

In an embodiment of the disclosure, the wireless network device may send the first indication information through a RRC message.

In an embodiment of the disclosure, the wireless network device may send the first indication information through a DCI message.

FIG. 8 is a flowchart of a parameter configuration method according to an embodiment. As illustrated in FIG. 8, the parameter configuration method is applied in a wireless network device, and includes the following.

At block S41, second indication information is determined.

In an embodiment of the disclosure, the second indication information is configured to instruct a terminal to determine a PRS configuration parameter based on the PRS configuration parameter set. The wireless network device determines the PRS configuration parameter based on the PRS configuration parameter set, and then determines the second indication information.

At block S42, the second indication information is sent.

In an embodiment of the disclosure, the wireless network device may send the second indication information to the UE based on at least one of the following messages:

a RRC message;

a MAC message;

a DCI message.

In an embodiment of the disclosure, the wireless network device may determine a preconfigured PRS configuration parameter set by receiving third indication information sent by the LMF. The wireless network device may determine to preconfigure the PRS configuration parameter set for the terminal according to the third indication information, and then may determine the first indication information to be sent to the UE.

In an embodiment of the disclosure, the wireless network device may receive the third indication information sent by the LMF through an NRPPa message.

In an implementation, the LMF may instruct the wireless network device to preconfigure the PRS configuration parameter set for the UE through an explicit indication manner. For example, the third indication information sent by the LMF includes the PRS configuration parameter set and an indicator configured to instruct the wireless network device to preconfigure the PRS configuration parameter set for the UE, and the wireless network device preconfigures the PRS configuration parameter set for the UE according to the received third indication information.

In an implementation, the LMF may instruct the wireless network device to preconfigure the PRS configuration parameter set for the UE through an implicit indication manner. For example, if the third indication information sent by the LMF includes the PRS configuration parameter set, the wireless network device may be implicitly instructed to preconfigure the PRS configuration parameter set for the UE, and the wireless network device may preconfigure the PRS configuration parameter set for the UE according to the received third indication information.

In an embodiment of the disclosure, the wireless network device may receive fourth indication information sent by the LMF. The fourth indication information is configured to instruct to determine the PRS configuration parameter based on the PRS configuration parameter set. The wireless network device may send a PRS according to the determined PRS configuration parameter. The PRS configuration parameter is a subset of the PRS configuration parameter set, and then the second indication information sent to the UE can be determined.

In an embodiment of the disclosure, the wireless network device may receive the fourth indication information sent by the LMF through an NRPPa message.

In an implementation, the LMF may instruct the wireless network device to determine the PRS configuration parameter based on the PRS configuration parameter set through an explicit indication manner. For example, the fourth indication information sent by the LMF includes the PRS configuration parameter and an indicator configured to instruct the wireless network device to send the PRS, and the wireless network device determines the PRS configuration parameter that the UE is instructed to activate according to the received fourth indication information and sends the PRS to the UE based on the indicator configured to instruct the wireless network device to send the PRS included in the fourth indication information.

In an implementation, the LMF may instruct the wireless network device to determine the PRS configuration parameter based on the PRS configuration parameter set through an implicit indication manner. For example, if the fourth indication information sent by the LMF includes the PRS configuration parameter, the wireless network device may be implicitly instructed to determine the PRS configuration parameter based on the PRS configuration parameter set, and determine to send the PRS to the UE.

In an embodiment of the disclosure, the second indication information at least includes one of the following:
a first indicator, configured to instruct the terminal to activate the PRS configuration parameter.
a second indicator, configured to instruct the terminal to receive the PRS.

The PRS configuration parameter that the UE is instructed to activate is a PRS configuration parameter subset. The first indicator and/or the second indicator may be a symbol such as bits.

In an implementation of the embodiment of the disclosure, the second indication information sent by the wireless network device includes only the first indicator, and it is determined that the PRS configuration parameter and/or the PRS configuration parameter subset activated by the UE is indicated based on the first indicator. Further, an implicit indication manner may be adopted, the UE is instructed implicitly based on the first indicator to receive the PRS according to the activated PRS configuration parameter and/or the PRS configuration parameter subset.

In an implementation, the second indication information sent by the wireless network device includes only the second indicator, and it is determined that the UE is instructed to receive the PRS based on the preconfigured PRS configuration parameter set. In an embodiment of the disclosure, if the second indication information sent by the wireless network device includes the second indicator, it is determined that the PRS configuration parameter set preconfigured by the UE includes one set of PRS configuration parameters.

In an implementation, the second indication information sent by the wireless network device includes the first indicator and the second indicator, it is determined that the PRS configuration parameter and/or the PRS configuration parameter subset to be activated by the UE is indicated based on the first indicator, and the UE is instructed explicitly based on the second indicator to receive the PRS.

In an embodiment of the disclosure, the second indication information may be second indication information sent to the UE through a RRC and/or MAC and/or DCI message.

In an embodiment of the disclosure, the wireless network device may receive the PRS measurement result reported by the UE.

In an embodiment of the disclosure, the wireless network device receives the PRS measurement result reported by the UE, and may send the PRS measurement result to the core network device (e.g., LMF).

The following embodiment will take a serving cell of the UE as a first base station and an adjacent cell as a second base station as an example to describe the parameter configuration method provided by the disclosure.

Figure 9:
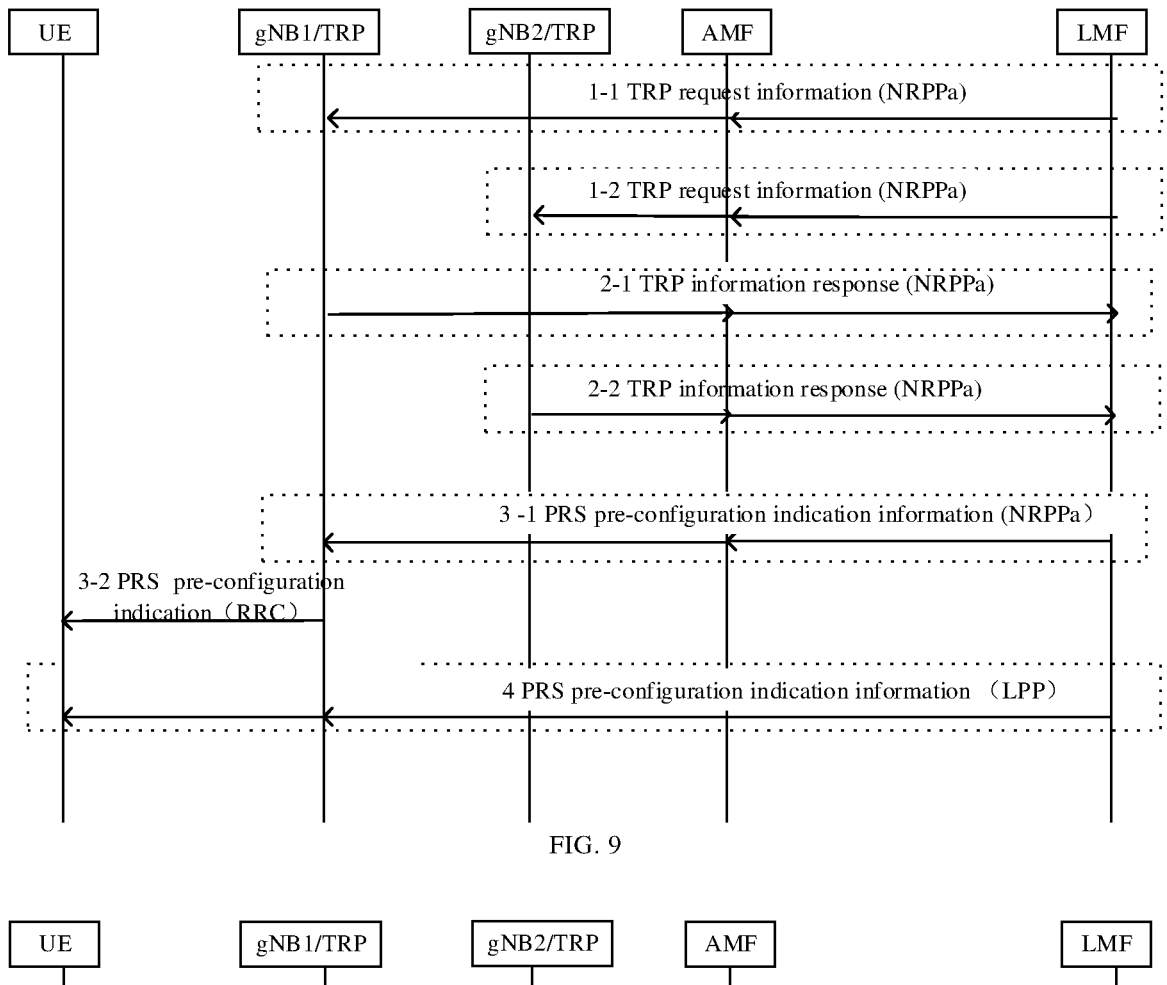
FIG. 9 is a schematic diagram of a process for indicating information according to an embodiment of the disclosure.

FIG. 9 is a schematic diagram of a process for indicating information according to an embodiment of the disclosure. As illustrated in FIG. 9, in an embodiment of the disclosure, the LMF sends an NRPPa message (for example, a TRP information request) to the first base station and/or the second base station. The first base station and/or the second base station is instructed through the NRPPa message to provide at least one set of PRS configuration parameters to the LMF, respectively.

The first base station and/or the second base station determines at least one set of PRS configuration parameters in response to receiving the NRPPa message, and sends the determined at least one set of PRS configuration parameters to the LMF through the NRPPa message.

The LMF determines a PRS configuration parameter set based on the received at least one set of PRS configuration parameters, and sends third indication information (i.e., 3-1PRS pre-configuration indication information) instructing the UE to preconfigure the PRS configuration parameter set to the serving cell of the UE (i.e., the first base station), and the first base station may send first indication information instructing the UE to preconfigure the PRS configuration parameter set based on the RRC message. Or the LMF sends the first indication information instructing the UE to preconfigure the PRS configuration parameter set to the UE through the LPP message.

Figure 10:
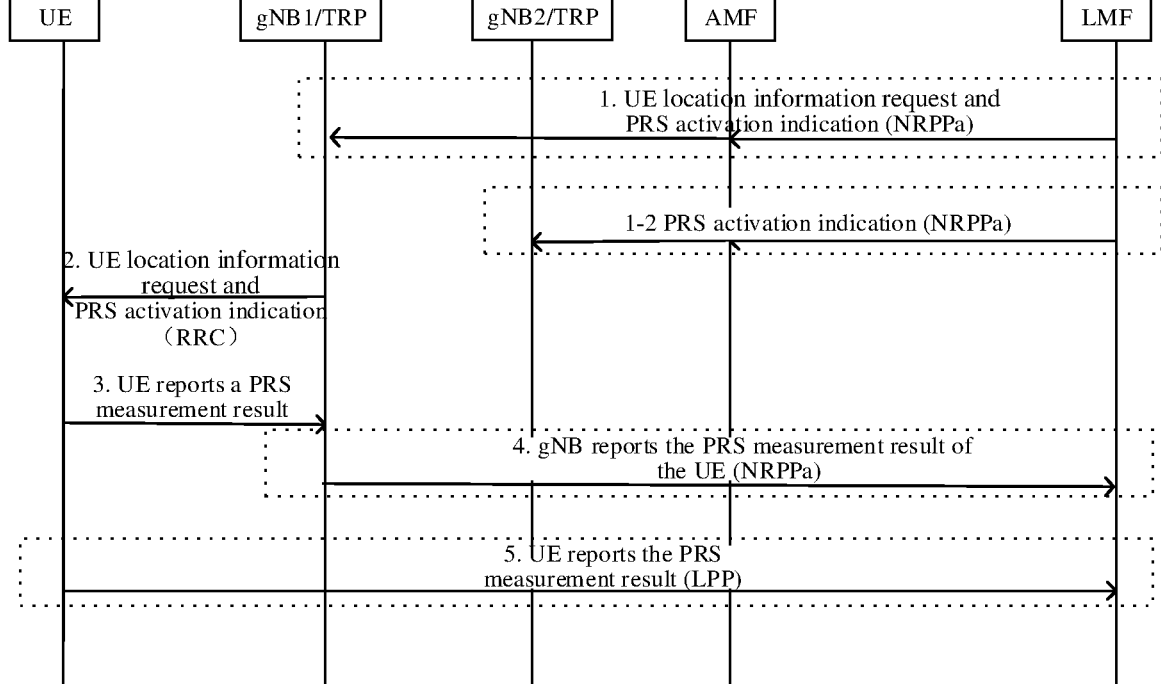
FIG. 10 is a schematic diagram of a process for indicating information according to another embodiment of the disclosure.

FIG. 10 is a schematic diagram of a process for indicating information according to an embodiment of the disclosure. As illustrated in FIG. 10, in an embodiment of the disclosure, the LMF may send a UE location information request to the first base station through an NRPPa message. The location information request includes fourth indication information, in which the fourth indication information is configured to instruct the terminal to activate the PRS configuration parameter for receiving the PRS. The fourth indication information includes a first indicator for activating the PRS configuration parameter subset and/or a second indicator for instructing the terminal to receive the PRS.

The LMF may send the fourth indication information to the second base station through an NRPPa message. The fourth indication information is configured to instruct the terminal to activate the PRS configuration parameter for receiving the PRS. The fourth indication information includes a first indicator for instructing activation of the PRS configuration parameter subset and/or a second indicator for instructing the terminal to receive the PRS.

The first base station sends the location information request to the UE through a RRC message, in which the location information request includes second indication information configured to instruct the UE to activate the PRS configuration for receiving the PRS. The second indication information includes a first indicator for instructing activation of the PRS configuration parameter subset and/or a second indicator for instructing the terminal to receive the PRS.

After receiving the second indication information sent by the first base station, the UE receives the PRS, completes the PRS measurement, and determines the PRS measurement result. The UE reports the PRS measurement result to the first base station, or the UE reports the PRS measurement result to the LMF through an LPP message.

Figures 11, 12, 13, 14:
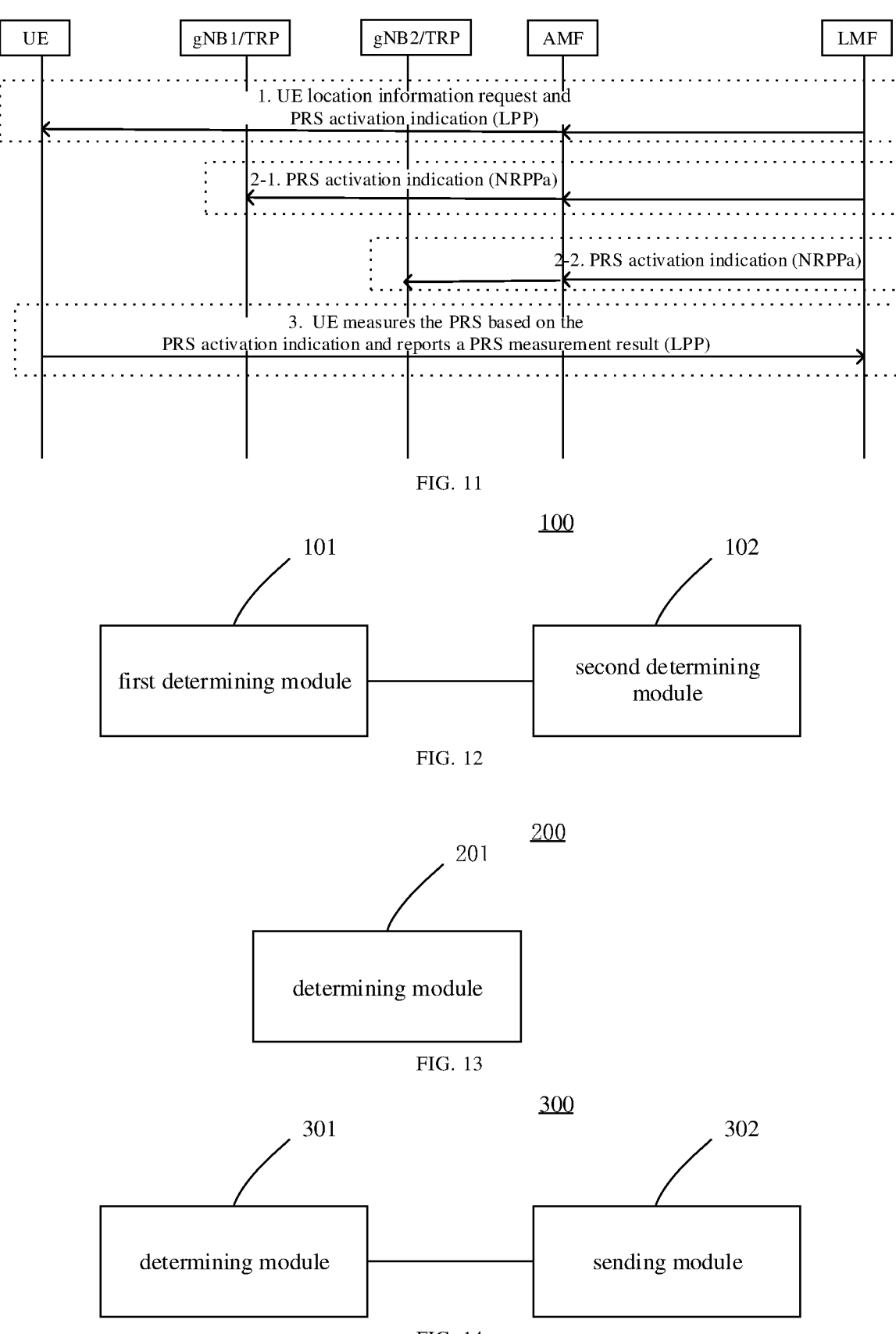
FIG. 11 is a schematic diagram of a process for indicating information according to a further embodiment of the disclosure.
FIG. 12 is a block diagram of a parameter configuration apparatus according to an embodiment of the disclosure.
FIG. 13 is a block diagram of a parameter configuration apparatus according to another embodiment of the disclosure.
FIG. 14 is a block diagram of a parameter configuration apparatus according to a further embodiment of the disclosure.

FIG. 11 is a schematic diagram of a process for indicating information according to an embodiment of the disclosure. As illustrated in FIG. 11, in an embodiment of the disclosure, the LMF may send a location information request to the UE through an LPP message (for example LPP information request). The location information request includes second indication information, and the second indication information is configured to instruct the terminal to receive a PRS and activate a PRS configuration parameter for receiving the PRS. The second indication information includes a first indicator for activating the PRS configuration parameter subset and/or a second indicator for instructing the terminal to receive PRS.

In an embodiment of the disclosure, the LMF may further send fourth indication information to the first base station through an NRPPa message. The fourth indication information is configured to instruct the terminal to activate the PRS configuration parameter for receiving the PRS. The fourth indication information includes a first indicator for activating the PRS configuration parameter subset and/or a second indicator for instructing the terminal to receive the PRS.

The UE receives the second indication information sent by the LMF or the second indication information sent by the first base station, determines to receive the PRS, completes the PRS measurement, and determines the PRS measurement result. The UE reports the PRS measurement result to the LMF through the LPP message.

Based on the same concept, an embodiment of the disclosure also provides a parameter configuration apparatus.

It can be understood that, in order to implement the above-mentioned functions, the transmission configuration apparatus provided by the embodiments of the disclosure includes corresponding hardware structures and/or software modules for executing respective functions. In combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

FIG. 12 is a block diagram of a parameter configuration apparatus according to an embodiment of the disclosure. As illustrated in FIG. 12, the parameter configuration apparatus 100 is applied to a terminal and includes a first determining module 101 and a second determining module 102.

The first determining module 101 is configured to determine a preconfigured positioning reference signal (PRS) configuration parameter set, in which the PRS configuration parameter set comprises at least one set of PRS configuration parameters. The second determining module 102 is configured to determine a PRS configuration parameter for receiving a PRS based on the PRS configuration parameter set.

In an embodiment of the disclosure, the first determining module 101 is configured to: receive first indication information, in which the first indication information is configured to instruct the terminal to preconfigure the PRS configuration parameter set.

In an embodiment of the disclosure, the second determining module 102 is configured to: receive second indication information, in which the second indication information is configured to instruct the terminal to determine the PRS configuration parameter based on the PRS configuration parameter set.

In an embodiment of the disclosure, the PRS configuration parameter is a subset of the PRS configuration parameter set.

In an embodiment of the disclosure, the second indication information at least includes one of the following:

a first indicator, configured to instruct the terminal to activate the PRS configuration parameter; a second indicator, configured to instruct the terminal to receive the PRS.

In an embodiment of the disclosure, the first indication information is determined based on a random access message and/or a radio resource control (RRC) message sent by a wireless network device;

or the first indication information is determined based on a long term evolution (LTE) positioning protocol (LPP) message sent by a location management function (LMF).

In an embodiment of the disclosure, the second indication information is determined based on a RRC message and/or a medium access control (MAC) message and/or a downlink control information (DCI) message sent by a wireless network device;

or the second indication information is determined based on an LPP message sent by an LMF.

In an embodiment of the disclosure, the apparatus is further configured to: perform measurement on the PRS based on the PRS configuration parameter, and send a PRS measurement result to a wireless network device and/or an LMF.

FIG. 13 is a block diagram of a parameter configuration apparatus according to an embodiment of the disclosure. As illustrated in FIG. 13, the parameter configuration apparatus 200 is applied to a core network device and includes a determining module 201.

The determining module 201 is configured to determine a preconfigured positioning reference signal (PRS) configuration parameter set.

In an embodiment of the disclosure, the apparatus is further configured to: send first indication information, in which the first indication information is configured to instruct the terminal to preconfigure the PRS configuration parameter set.

In an embodiment of the disclosure, the apparatus is further configured to: send second indication information, in which the second indication information is configured to instruct the terminal to determine the PRS configuration parameter based on the PRS configuration parameter set.

In an embodiment of the disclosure, the PRS configuration parameter is a subset of the PRS configuration parameter set.

In an embodiment of the disclosure, the second indication information at least includes one of the following:

a first indicator, configured to instruct the terminal to activate the PRS configuration parameter; a second indicator, configured to instruct the terminal to receive the PRS.

In an embodiment of the disclosure, the apparatus is further configured to: send the first indication information based on a long term evolution (LTE) positioning protocol (LPP) message.

In an embodiment of the disclosure, the apparatus is further configured to: send the second indication information based on an LPP message.

In an embodiment of the disclosure, the apparatus is further configured to: send third indication information, in which the third indication information is configured to indicate the preconfigured PRS configuration parameter set to a wireless network device.

In an embodiment of the disclosure, the third indication information is further configured to instruct the wireless network device to preconfigure the PRS configuration parameter set for the terminal.

In an embodiment of the disclosure, the apparatus is further configured to: send fourth indication information, in which the fourth indication information is configured to instruct a wireless network device to determine a PRS configuration parameter based on the PRS configuration parameter set.

In an embodiment of the disclosure, the fourth indication information is further configured to instruct the wireless network device to send a PRS based on the PRS configuration parameter.

In an embodiment of the disclosure, the apparatus is further configured to: receive a PRS measurement result sent by the terminal and send the PRS measurement result to an LMF.

FIG. 14 is a block diagram of a parameter configuration apparatus according to an embodiment of the disclosure. As illustrated in FIG. 14, the parameter configuration apparatus 300 is applied to a wireless network device and includes a determining module 301 and a sending module 302.

The determining module 301 is configured to determine first indication information, in which the first indication information is configured to instruct a terminal to preconfigure a PRS configuration parameter set. The sending module 302 is configured to send the first indication information.

In an embodiment of the disclosure, the determining module 301 is further configured to: determine second indication information, in which the second indication information is configured to instruct the terminal to determine a PRS configuration parameter based on the PRS configuration parameter set; and send the second indication information.

In an embodiment of the disclosure, the apparatus is further configured to: receive third indication information, and determine the preconfigured PRS configuration parameter set based on the third indication information.

In an embodiment of the disclosure, the third indication information is further configured to instruct the wireless network device to preconfigure the PRS configuration parameter set for the terminal.

In an embodiment of the disclosure, the apparatus is further configured to: receive fourth indication information, in which the fourth indication information is configured to instruct to determine a PRS configuration parameter based on the PRS configuration parameter set.

In an embodiment of the disclosure, the fourth indication information is further configured to instruct the wireless network device to send a PRS based on the PRS configuration parameter.

In an embodiment of the disclosure, the PRS configuration parameter is a subset of the PRS configuration parameter set.

In an embodiment of the disclosure, the second indication information at least includes one of the following:

a first indicator, configured to instruct the terminal to activate the PRS configuration parameter; a second indicator, configured to instruct the terminal to receive the PRS.

In an embodiment of the disclosure, the first indication information is sent through a random access message and/or a radio resource control (RRC) message.

In an embodiment of the disclosure, the second indication information is sent through a RRC message and/or a medium access control (MAC) message and/or a downlink control information (DCI) message sent by a wireless network device.

In an embodiment of the disclosure, the sending module 302 is configured to: receive a PRS measurement result sent by the terminal, and send the PRS measurement result to a location management function (LMF).

Regarding the apparatus in the above embodiments, the specific way in which each module performs its operation has been described in detail in the embodiments related to the method, and will not be described in detail here.

Figure 15:
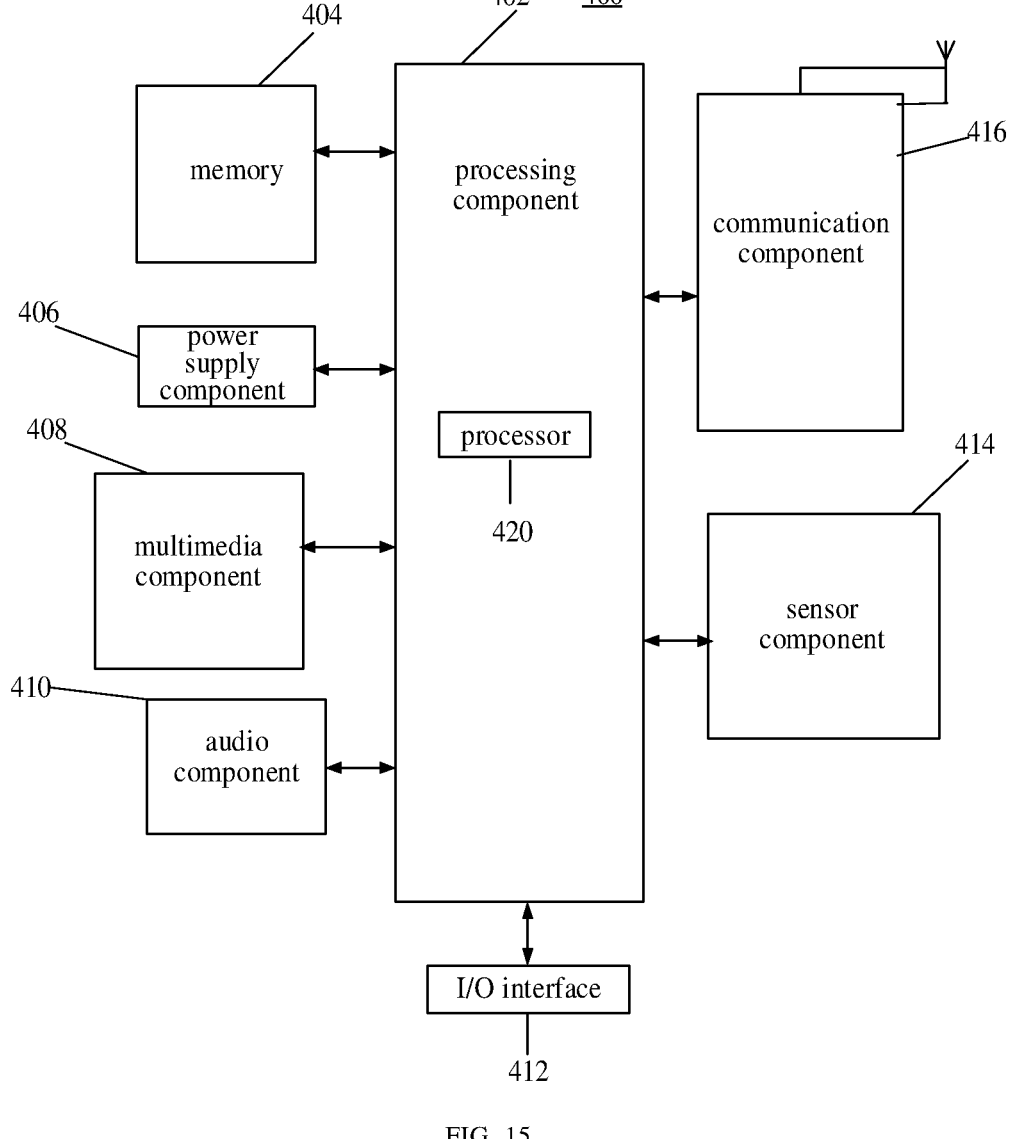
FIG. 15 is a block diagram of an apparatus for configuring a parameter according to an embodiment of the disclosure.

FIG. 15 is a block diagram of an apparatus 400 for configuring a parameter according to an embodiment of the disclosure. For example, the apparatus 400 may be a terminal such as a smart phone, a computer, a digital broadcast terminal, a messaging device, a game console, a tablet device, a medical device, a fitness device, a personal digital assistant, and the like.

As illustrated in FIG. 15, the apparatus 400 may include one or more components: a processing component 402, a memory 404, a power supply component 406, a multimedia component 408, an audio component 410, an input/output (I/O) interface 412, a sensor component 414, and a communication component 416.

The processing component 402 generally controls the whole operation of the apparatus 400, such as the operations related to display, phone call, data communication, camera operation and recording operation. The processing component 402 may include one or more processors 420 to perform instructions, to complete all or part of steps of the above method. In addition, the processing component 402 may include one or more modules for the convenience of interaction between the processing component 402 and other components. For example, the processing component 402 may include a multimedia module for the convenience of interaction between the multimedia component 408 and the processing component 402.

The memory 404 is configured to store all types of data to support the operation of the apparatus 400. Examples of the data include the instructions of any applications or methods operated on the apparatus 400, contact data, phone book data, messages, pictures, videos, etc. The memory 404 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 406 may provide power for all components of the apparatus 400. The power supply component 406 may include power supply management system, one or more power supplies, and other units related to generating, managing and distributing power for the apparatus 400.

The multimedia component 408 includes a display screen of an output interface provided between the apparatus 400 and the user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touch, swipe, and gestures on the touch panel. The touch sensor may not only sense the boundaries of a touch or swipe action, but also detect the duration and pressure associated with the touch or swipe action. In some embodiments, the multimedia component 408 includes a front camera and/or a rear camera. When the apparatus 400 is in operation mode, such as shooting mode or video mode, the front camera or the rear camera may receive the external multimedia data. Each front camera and rear camera may be a fixed optical lens system or an optical lens system with a focal length and an optical zoom capacity.

The audio component 410 is configured as output and/or input signal. For example, the audio component 410 includes a microphone (MIC). When the apparatus 400 is in operation mode, such as call mode, record mode, and speech recognition mode, the microphone is configured to receive the external audio signals. The audio signals received may be further stored in the memory 404 or sent via the communication component 416. In some embodiments, the audio component 410 further includes a speaker configured to output an audio signal.

The I/O interface 412 provides an interface for the processing component 402 and the peripheral interface module, and the peripheral interface module may be a keyboard, a click wheel, a button, etc. The buttons may include but not limited to a home button, a volume button, a start button and a lock button.

The sensor component 414 includes one or more sensors, configured to provide various aspects of status assessment for the apparatus 400. For example, the sensor component 414 may detect the on/off state of the apparatus 400 and the relative positioning of the component. For example, the component is a display and a keypad of the apparatus 400. The sensor component 414 may further detect the location change of the apparatus 400 or one component of the apparatus 400, the presence or absence of contact between the user and the apparatus 400, the orientation or acceleration/deceleration of the apparatus 400, and the temperature change of the apparatus 400. The sensor component 414 may include a proximity sensor, which is configured to detect the existence of the objects nearby without any physical contact. The sensor component 414 may further include a light sensor such as CMOS or CCD image sensor, which is configured to use in imaging applications. In some embodiments, the sensor component 414 may further include an acceleration transducer, a gyroscope sensor, a magnetic sensor, a pressure sensor or a temperature sensor.

The communication component 416 is configured for the convenience of wire or wireless communication between the apparatus 400 and other devices. The apparatus 400 may access wireless networks based on a communication standard, such as Wi-Fi, 2G, or 3G, or their combination. In an exemplary embodiment, the communication component 416 receives broadcast signals or broadcast-related information from an external broadcast management system via a broadcast channel. In an exemplary embodiment, the communication component 416 further includes a near field communication (NFC) module to facilitate short-range communication. For example, an NFC module may be implemented based on a radio frequency identification (RFID) technology, an infrared data association (IRDA) technology, an ultra-wideband (UWB) technology, Bluetooth (BT) technology and other technologies.

In an embodiment, the apparatus 400 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above.

In an exemplary embodiment, a non-transitory computer-readable storage medium is further provided which includes instructions, such as the memory 404 including instructions, in which the instructions may be executed by the processor 420 of the apparatus 400 to complete the above method. For example, the non-transitory computer-readable storage medium may be a ROM, a random access memory (RAM), a CD-ROM, a magnetic tape, a floppy disk, an optical data storage device, etc.

Figure 16:
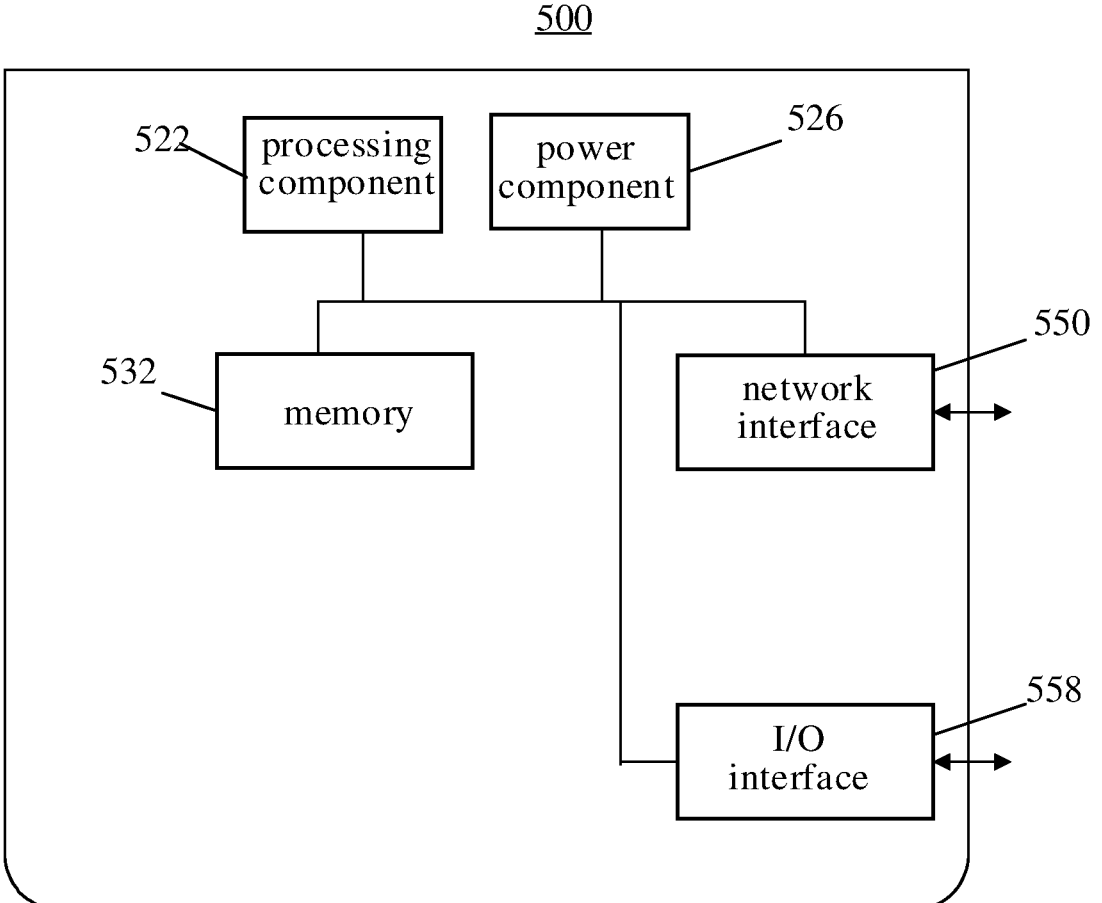
FIG. 16 is a block diagram of an apparatus for configuring a parameter according to another embodiment of the disclosure.

FIG. 16 is a block diagram of an apparatus 500 for configuring a parameter according to another embodiment of the disclosure. For example, the apparatus 500 may be provided as a server. As illustrated in FIG. 16, the apparatus 500 includes a processing component 522, which includes one or more processors, and a memory resource represented by a memory 532 for storing instructions executable by the processing component 522, such as application programs. The application program stored in the memory 532 may include one or more modules, each module corresponds to a set of instructions. In addition, the processing component 522 is configured to execute instructions to perform the method described above and applied to the network side device.

The apparatus 500 may also include a power component 526 configured to perform power management of the apparatus 500, a wired or wireless network interface 550 configured to connect the apparatus 500 to the network, and an I/O interface 558. The apparatus 500 may operate based on an operating system stored on the memory 532, such as Windows Server™, Mac OS X™, Unix™, Linux™, Free-BSD™ or the like.

It should be further understood that in the present disclosure, the term "a plurality of" refers to two or more, and other quantifiers are similar. The term "and/or", which describes the association relationship of the associated objects, means that there can be three kinds of relationships, for example, A and/or B, which can mean that A exists alone, A and B exist at the same time, and B exists alone. The character "/" generally indicates an "or" relationship between the associated objects. The singular forms "a," "the," and "the" are intended to include the plural forms as well, unless the context clearly dictates otherwise.

It should be understood that although the terms "first", and "second", may be used in this disclosure to describe various information, the information should not be limited to these terms. These terms are only used to distinguish the same type of information from each other and do not imply a particular order or level of importance. In fact, the expressions "first", "second" etc. are used completely interchangeably. For example, without departing from the scope of the disclosure, the first information may also be referred to as the second information, and similarly, the second information may also be referred to as the first information.

It is further to be understood that although the operations in the embodiments of the present disclosure are described in a specific order in the drawings, it should not be construed as requiring that the operations be performed in the specific order shown or the serial order, or requiring to perform all shown operations to obtain the desired result. In certain circumstances, multitasking and parallel processing may be advantageous.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A parameter configuration method, performed by a terminal, comprising:

receiving first indication information, wherein the first indication information is configured to instruct the terminal to preconfigure a positioning reference signal (PRS) configuration parameter set, wherein the PRS configuration parameter set comprises at least one set of PRS configuration parameters, and each set of PRS configuration parameters corresponds to PRS configuration parameters of multiple different wireless network devices; and receiving second indication information, wherein the second indication information is configured to instruct the terminal to determine a set of PRS configuration parameters for receiving a PRS based on the PRS configuration parameter set, wherein determining the set of PRS configuration parameters comprises determining one set of PRS configuration parameters from the at least one set of PRS configuration parameters comprised in the PRS configuration parameter set, wherein the first indication information is determined based on a long term evolution (LTE) positioning protocol (LPP) message sent by a location management function (LMF), and the second indication information is determined based on the LPP message sent by the LMF.

2. The method according to claim 1, wherein the second indication information at least comprises one of:

a first indicator, configured to instruct the terminal to activate the set of PRS configuration parameters; or a second indicator, configured to instruct the terminal to receive the PRS.

3. The method according to claim 1, further comprising:

performing measurement on the PRS based on the set of PRS configuration parameters, and sending a PRS measurement result to at least one of a wireless network device or the LMF.

4. A parameter configuration method, performed by a core network device, comprising:

determining a positioning reference signal (PRS) configuration parameter set preconfigured for a terminal, wherein the PRS configuration parameter set comprises at least one set of PRS configuration parameters, and each set of PRS configuration parameters corresponds to PRS configuration parameters of multiple different wireless network devices;

sending first indication information, wherein the first indication information is configured to instruct the terminal to preconfigure the PRS configuration parameter set; and sending second indication information, wherein the second indication information is configured to instruct the terminal to determine a set of PRS configuration parameters based on the PRS configuration parameter set, wherein determining the set of PRS configuration parameters comprises determining one set of PRS configuration parameters from the at least one set of PRS configuration parameters comprised in the PRS configuration parameter set, wherein the first indication information is determined based on a long term evolution (LTE) positioning protocol (LPP) message sent by a location management function (LMF), and the second indication information is determined based on the LPP message sent by the LMF.

5. The method according to claim 4, wherein the second indication information at least comprises one of:

a first indicator, configured to instruct the terminal to activate the set of PRS configuration parameters; or a second indicator, configured to instruct the terminal to receive the PRS.

6. The method according to claim 4, further comprising:

sending third indication information, wherein the third indication information is configured to instruct a wireless network device to determine the set of PRS configuration parameters based on the PRS configuration parameter set.

7. The method according to claim 6, wherein the third indication information is further configured to instruct the wireless network device to send a PRS based on the set of PRS configuration parameters.

8. The method according to claim 4, further comprising:

receiving a PRS measurement result sent by at least one of the terminal or a wireless network device.

9. A parameter configuration apparatus, comprising:

a processor; and a memory, configured to store instructions executable by the processor;

wherein the processor is configured to perform the parameter configuration method according to claim 4.

10. A parameter configuration method, performed by a wireless network device, comprising:

determining first indication information, wherein the first indication information is configured to instruct a terminal to preconfigure a PRS configuration parameter set, and the PRS configuration parameter set comprises at least one set of PRS configuration parameters, and each set of PRS configuration parameters corresponds to PRS configuration parameters of multiple different wireless network devices;

sending the first indication information; and determining second indication information, wherein the second indication information is configured to instruct the terminal to determine a set of PRS configuration parameters based on the PRS configuration parameter set, wherein determining the set of PRS configuration parameters comprises determining one set of PRS configuration parameters from the at least one set of PRS configuration parameters comprised in the PRS configuration parameter set.

11. The method according to claim 10, further comprising:

receiving third indication information, and determining the preconfigured PRS configuration parameter set based on the third indication information.

12. The method according to claim 10, further comprising:

receiving fourth indication information, wherein the fourth indication information is configured to instruct to determine the set of PRS configuration parameters based on the PRS configuration parameter set.

13. The method according to claim 12, wherein the fourth indication information is further configured to instruct the wireless network device to send a PRS based on the set of PRS configuration parameters.

* * * * *